(12) United States Patent
Vanapalli et al.

(10) Patent No.: US 11,735,985 B2
(45) Date of Patent: Aug. 22, 2023

(54) ELECTRIC MACHINE ROTOR AND METHOD OF FORMING

(71) Applicant: GE AVIATION SYSTEMS LLC, Grand Rapids, MI (US)

(72) Inventors: Veeraraju Vanapalli, Bangalore (IN); Deepak Ghiya, Bangalore (IN); Raghavendra Rao Adharapurapu, Bangalore (IN); Hao Huang, Troy, OH (US); James Patrick Mahle, Dayton, OH (US)

(73) Assignee: GE Aviation Systems LLC, Grand Rapids, MI (US)

( * ) Notice: Subject to any disclaimer, the term of this patent is extended or adjusted under 35 U.S.C. 154(b) by 252 days.

(21) Appl. No.: 16/987,653

(22) Filed: Aug. 7, 2020

(65) Prior Publication Data

US 2022/0045584 A1    Feb. 10, 2022

(51) Int. Cl.
*H02K 15/09* (2006.01)
*H02K 15/02* (2006.01)
*H02K 15/14* (2006.01)

(52) U.S. Cl.
CPC ............. *H02K 15/09* (2013.01); *H02K 15/02* (2013.01); *H02K 15/14* (2013.01); *B64D 2221/00* (2013.01)

(58) Field of Classification Search
CPC ........ B64D 2221/00; H02K 1/24; H02K 1/26; H02K 1/265; H02K 15/02; H02K 15/022; H02K 15/09; H02K 15/14; H02K 3/51
See application file for complete search history.

(56) References Cited

U.S. PATENT DOCUMENTS

| | | | |
|---|---|---|---|
| 5,647,704 A | 7/1997 | Turchan | |
| 5,647,706 A | 7/1997 | Lehmler et al. | |
| 6,543,973 B2 | 4/2003 | Lapikas et al. | |
| 7,716,802 B2 | 5/2010 | Stern et al. | |
| 8,359,741 B2 | 1/2013 | McKown et al. | |
| 10,071,525 B2 | 9/2018 | Susnjara et al. | |
| 10,191,474 B2 | 1/2019 | Nelaturi et al. | |
| 2004/0140727 A1 | 7/2004 | Tornquist et al. | |
| 2010/0320860 A1* | 12/2010 | Patel | H02K 3/527 29/598 |
| 2011/0133579 A1 | 6/2011 | Vanderzyden | |
| 2015/0249370 A1 | 9/2015 | Wirsch, Jr. et al. | |
| 2016/0149451 A1 | 5/2016 | Teter et al. | |
| 2018/0205284 A1 | 7/2018 | Huang et al. | |
| 2019/0105712 A1 | 4/2019 | Kamitani et al. | |
| 2022/0045584 A1* | 2/2022 | Vanapalli | H02K 1/26 |

FOREIGN PATENT DOCUMENTS

EP     3046232 A1    7/2016

* cited by examiner

*Primary Examiner* — Minh N Trinh
(74) *Attorney, Agent, or Firm* — McGarry Bair PC

(57) ABSTRACT

A method and apparatus for forming a rotor for an electric machine includes serially adding layers of material to form a rotor body having a radially-extending post configured to receive a set of electrically-conductive windings, and also having a radially-extending winding end turn support formed contiguously from the rotor body.

13 Claims, 10 Drawing Sheets

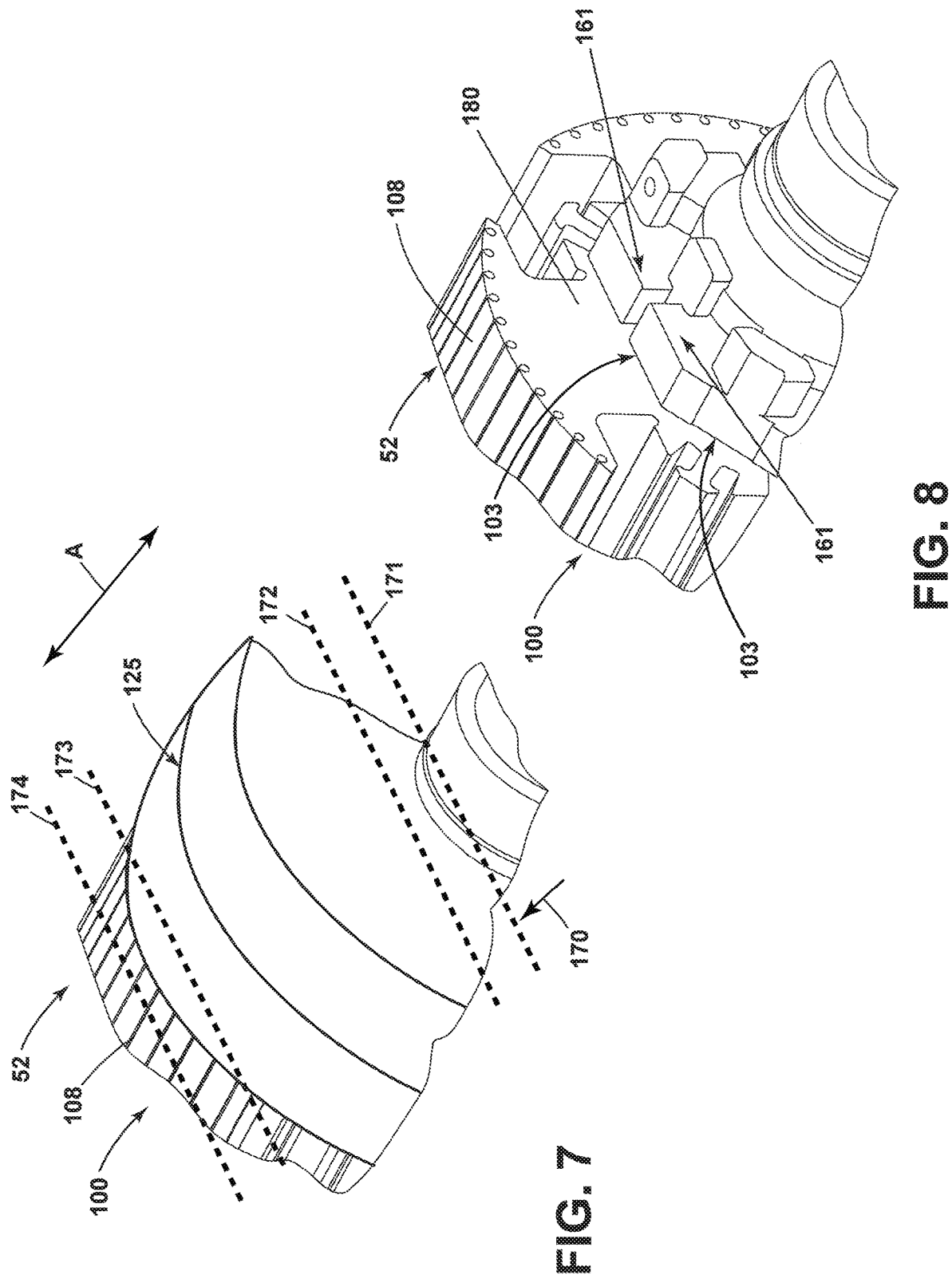

ELECTRIC MACHINE ROTOR AND METHOD OF FORMING

TECHNICAL FIELD

The disclosure relates to a method and apparatus for forming an electric machine, and more specifically a method of forming a rotor core of an electric machine.

BACKGROUND

Electric machines, such as electric motors or electric generators, are used in energy conversion. In the aircraft industry, it is common to combine a motor mode and a generator mode in the same electric machine, where the electric machine in motor mode functions to start the engine, and, depending on the mode, also functions as a generator. Regardless of the mode, an electric machine typically includes a rotor having rotor windings that are driven to rotate by a source of rotation, such as a mechanical or electrical machine, which for some aircraft may be a gas turbine engine.

BRIEF DESCRIPTION

In one aspect, the disclosure relates to a method of forming a rotor for an electric machine. The method includes serially adding layers of material along a build direction to form a rotor body having a radially-extending post configured to receive a set of electrically-conductive windings, and also having a radially-extending winding end turn support formed contiguously from the rotor body, and removing material from the rotor body by relative rotation of one of the rotor body or a removal tool to the other of the rotor body or the removal tool such that a radial segment of the winding end turn support is not contiguous with the rotor body.

In another aspect, the disclosure relates to a method of forming a rotor for an electric machine. The method includes forming a monolithic rotor body having a central shaft defining an axial direction, a hollow conduit defining a fluid passage with a first portion having a U-shaped bend and a second portion extending axially, a radially-extending post configured to receive a set of windings, and a winding end turn support spaced axially from the post, and removing a portion of the rotor body by relative rotation of one of the rotor body or a removal tool to the other of the rotor body or the removal tool to define a recess between the winding end turn support and the post.

In yet another aspect, the disclosure relates to a rotor body, including a post extending in a radial direction and configured to receive a set of electrically-conductive windings about the post, a winding end turn support axially spaced from the post by a radially-extending recess, and at least one conduit within the rotor body defining a fluid passage, the at least one conduit having a U-shaped bend located within the winding end turn support and a second portion at least partially radially underlying the recess.

These and other features, aspects and advantages of the present disclosure will become better understood with reference to the following description and appended claims. The accompanying drawings, which are incorporated in and constitute a part of this specification, illustrate aspects of the disclosure and, together with the description, serve to explain the principles of the disclosure.

BRIEF DESCRIPTION OF THE DRAWINGS

A full and enabling disclosure of the present description, including the best mode thereof, directed to one of ordinary skill in the art, is set forth in the specification, which makes reference to the appended figures, in which:

FIG. 7 is a perspective view of a portion of the rotor body of FIG. 4 having a support in accordance with various aspects described herein.

FIG. 8 is a perspective view of the rotor body of FIG. 7 after removal of a portion of the rotor body.

DETAILED DESCRIPTION

Figure 1:
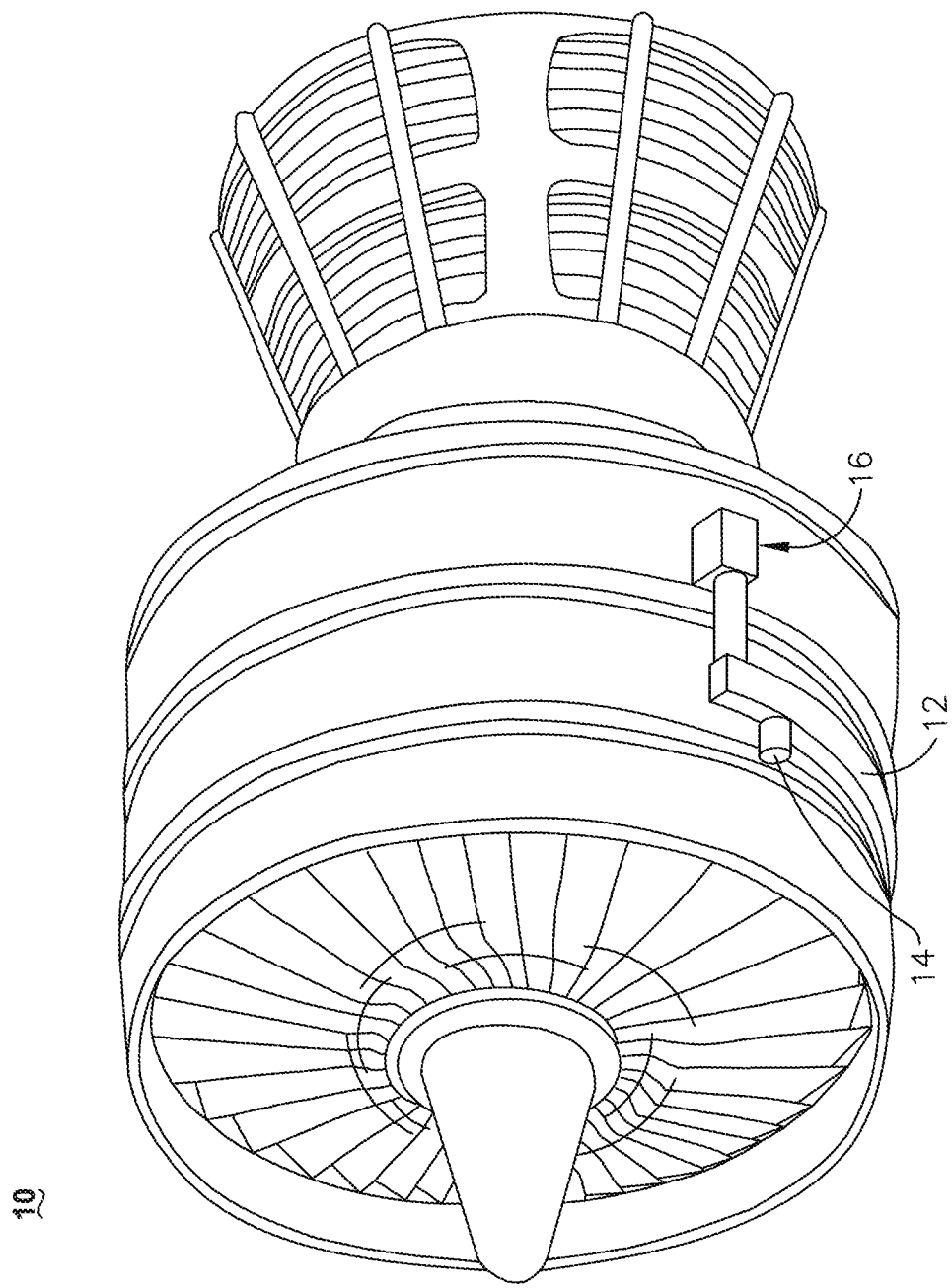
FIG. 1 is an isometric view of a gas turbine engine having an electric machine in the form of a generator in accordance with various aspects described herein.

The disclosure is generally directed toward a rotor core or body for an electric machine having a support structure utilized during a formation process, such as to ease stresses on other components during formation, as well as the removal of at least a portion of the rotor body upon completion of the formation process. Support structures utilized during building are typically removed via manual methods, including chiseling. Such methods can cause undesirable surface variations, e.g. etching, burrs, or other surface features that can lead to a concentration of electric charge during operation of the electric machine. Aspects of the disclosure provide for a rotor body with a smooth surface finish and ease of removal, thereby improving process efficiencies and providing a more reliable part for the electric machine in operation.

Aspects of the disclosure can be implemented in any environment using an rotor, such as an electric machine, a motor, a power generator, or the like. For purposes of this description, such an electric machine will be generally referred to as a generator, an electric machine assembly, or similar language, which is meant to clarify that one or more stator/rotor combinations can be included in the machine. While this description is primarily directed toward an electric machine providing power generation, it is also applicable to an electric machine providing both a driving force and power generation. Further, while this description is primarily directed toward an aircraft environment, aspects of the disclosure are applicable in any environment using a rotor or an electric machine. Thus, a brief summary of a contemplated environment should aid in a more complete understanding.

Additionally, while terms such as "voltage," "current," and "power" can be used herein, it will be evident to one skilled in the art that these terms can be interrelated when describing aspects of the electric machine or machine operations.

While "a set of" various elements will be described, it will be understood that "a set" can include any number of the respective elements, including only one element. As used herein, the terms "axial" or "axially" refer to a dimension along a longitudinal axis of a generator or along a longitudinal axis of a component disposed within the generator.

As used herein, the terms "radial" or "radially" refer to a dimension extending between a center longitudinal axis, an outer circumference, or a circular or annular component disposed thereof. The use of the terms "proximal" or "proximally," either by themselves or in conjunction with the terms "radial" or "radially," refers to moving in a direction toward the center longitudinal axis, or a component being relatively closer to the center longitudinal axis as compared to another component.

All directional references (e.g., radial, axial, upper, lower, upward, downward, left, right, lateral, front, back, top, bottom, above, below, vertical, horizontal, clockwise, counterclockwise) are only used for identification purposes to aid the reader's understanding of the disclosure, and do not create limitations, particularly as to the position, orientation, or use thereof. Connection references (e.g., attached, coupled, connected, and joined) are to be construed broadly and can include intermediate members between a collection of elements and relative movement between elements unless otherwise indicated. As such, connection references do not necessarily infer that two elements are directly connected and in fixed relation to each other.

The exemplary drawings are for purposes of illustration only and the dimensions, positions, order and relative sizes reflected in the drawings attached hereto can vary.

FIG. 1 illustrates a gas turbine engine 10 having an accessory gear box (AGB) 12 and an electric machine in the form of a generator 14. The gas turbine engine 10 can be a turbofan engine, such as a General Electric GEnx or CF6 series engine, commonly used in aviation or it could be a variety of other known gas turbine engines such as a turboprop or turboshaft. The AGB 12 can be coupled to a turbine shaft (not shown) of the gas turbine engine 10 by way of a mechanical power take off 16. The gas turbine engine 10 can be any suitable gas turbine engine used in modern aviation or it could be a variety of other known gas turbine engines such as a turboprop or turboshaft. The type and specifics of the gas turbine engine 10 are not germane to the disclosure and will not be described further herein. While a generator 14 is shown and described, aspects of the disclosure can include any electrical machine or generator.

Figure 2:
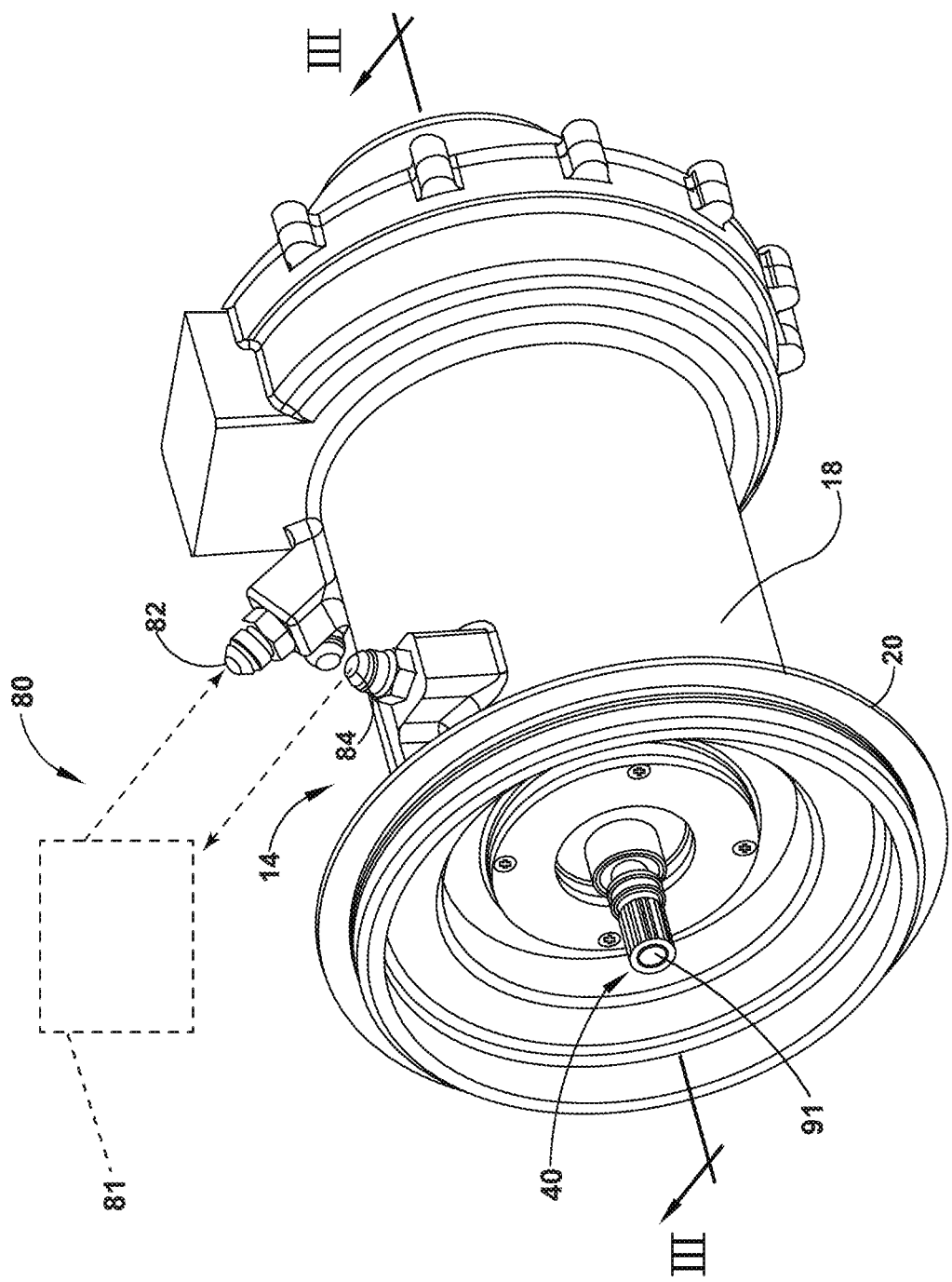
FIG. 2 is an isometric view of an exterior of the generator of FIG. 1 in accordance with various aspects described herein.

FIG. 2 more clearly illustrates a non-limiting example generator 14 and its housing 18 in accordance with aspects of the disclosure. The generator 14 can include a clamping interface 20, used to clamp the generator 14 to the AGB (not shown). Multiple electrical connections can be provided on the exterior of the generator 14 to provide for the transfer of electrical power to and from the generator 14. The electrical connections can be further connected by cables to an electrical power distribution node of an aircraft having the gas turbine engine 10 to power various items on the aircraft, such as lights and seat-back monitors. The generator 14 can include a liquid coolant system for cooling or dissipating heat generated by components of the generator 14 or by components proximate to the generator 14, one non-limiting example of which can be the gas turbine engine 10. For example, the generator 14 can include a liquid cooling system 80 using oil as a coolant.

The liquid cooling system 80 can include a cooling fluid inlet port 82 and a cooling fluid outlet port 84 for controlling the supply of coolant to the generator 14. In the example shown, the generator 14 includes the cooling system 80 fluidly coupled to a coolant source 81. The coolant from the coolant source 81 can include, but is not limited to, cooling oil. In one non-limiting example, the cooling fluid inlet and output ports 82, 84 can be utilized for cooling at least a portion of a rotor or stator of the generator 14. The liquid cooling system 80 can also include a second coolant outlet port 91, shown at a rotatable shaft portion of the generator 14. Other non-limiting aspects of the disclosure can further include other liquid cooling system components, such as a liquid coolant reservoir fluidly coupled with the cooling fluid inlet port 82, a rotatable shaft coolant inlet port, the cooling fluid outlet port 84, or a generator coolant outlet port, and a liquid coolant pump to forcibly supply the coolant through the ports 82, 84, 91 or generator 14.

Figure 3:
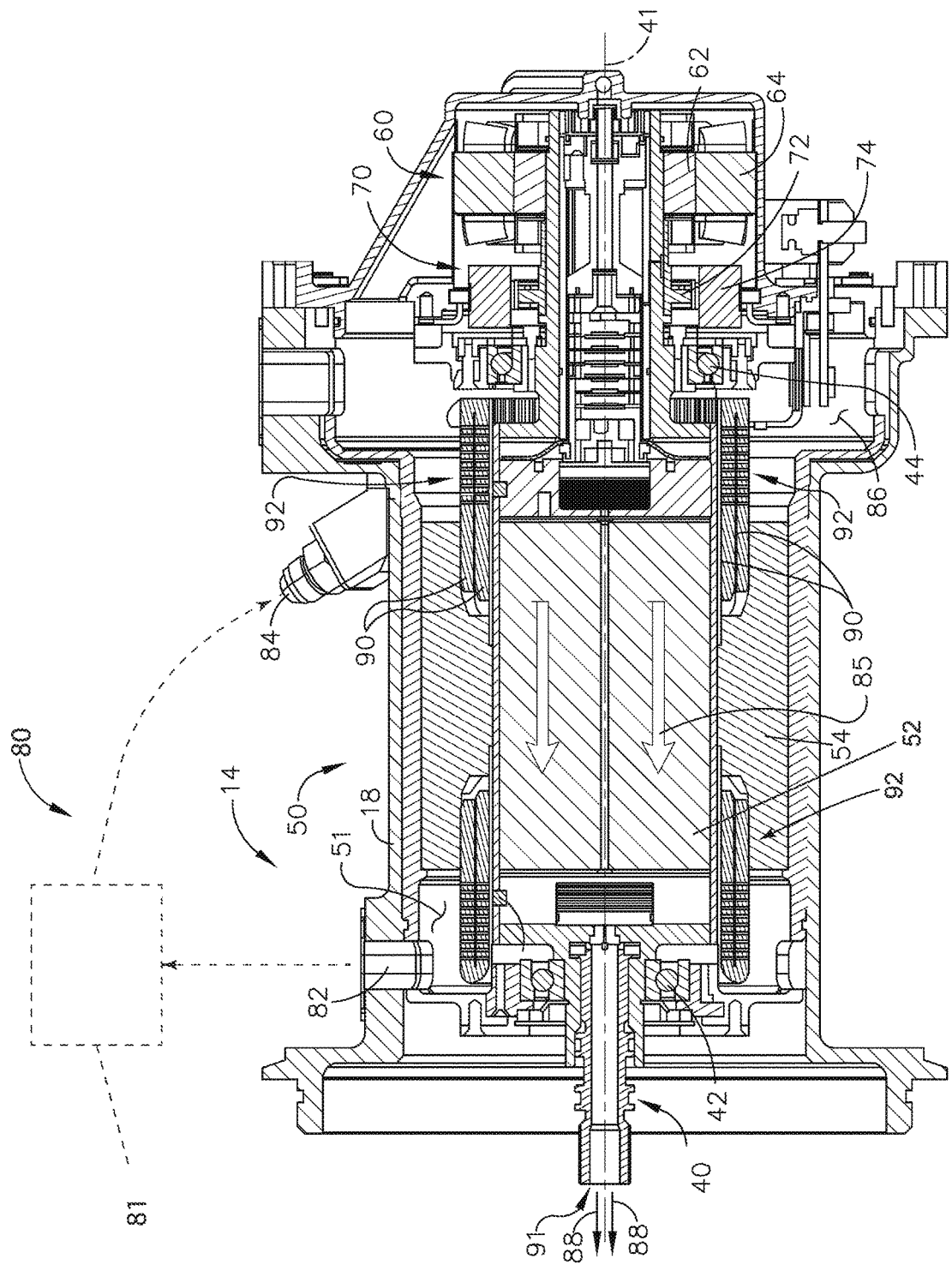
FIG. 3 is a schematic cross-sectional view of the generator of FIG. 2, taken along line III-III, in accordance with various aspects described herein.

A non-limiting interior of the generator 14 is best seen in FIG. 3, which is a cross-sectional view of the generator 14 shown in FIG. 2 taken along line A rotatable drive shaft 40 is located within the generator 14 and is the primary structure for supporting a variety of components. The drive shaft 40 can have a single diameter or one that can vary along its length. The drive shaft 40 is supported by spaced bearings 42 and 44 and configured to rotate about a rotational axis 41. Several of the elements of the generator 14 have a fixed component and a rotating component, with the fixed component fixed relative to the housing 18 and with the rotating component being provided on, or rotatably fixed relative to the drive shaft 40. Examples of these elements can include a main machine 50, housed within a main machine cavity 51, an exciter 60, and a permanent magnet generator (PMG) 70. The generator 14 can include any suitable form, including a Pulse-Width Modulation (PWM) driven electric machine, a sine wave machine, or the like. The corresponding rotating component comprises a main machine rotor 52 (also referred to as a rotor core 52), an exciter rotor 62, and a PMG rotor 72, respectively, and the corresponding fixed component comprises a main machine stator 54 (also referred to as a stator core), an exciter stator 64, and a PMG stator 74. In this manner, the main machine rotor 52, exciter rotor 62, and PMG rotor 72 are disposed on and co-rotate with the drive shaft 40. The fixed components can be mounted to any suitable part of the housing 18, and include the main machine stator 54, exciter stator 64, and PMG stator 74. Collectively, the fixed components define an interior through which the drive shaft 40 extends and rotates relative thereto.

It will be understood that the main machine rotor 52, exciter rotor 62, and PMG rotor 72 can have a set of rotor poles, and that the main machine stator 54, exciter stator 64, and PMG stator 74 can have a set of stator poles. The set of rotor poles can generate a set of magnetic fields relative to the set of stator poles, such that the rotation of the rotor magnetic fields relative to the stator poles generate current in the respective stator components.

At least one of the rotor poles and stator poles can be formed by a core with a post and wire wound about the post to form a winding, with the winding having at least one end turn. Aspects of the disclosure shown include at least one set of stator windings 90 arranged longitudinally along the housing 18, that is, in parallel with housing 18 and the rotational axis 41. The set of stator windings 90 can also include a set of stator winding end turns 92 extending axially beyond opposing ends of a longitudinal length of a main machine stator 54.

The components of the generator 14 can be any combination of known generators. For example, the main machine 50 can be either a synchronous or asynchronous generator. In addition to the accessories shown in this aspect, there can be other components that need to be operated for particular applications. For example, in addition to the electromechanical accessories shown, there can be other accessories driven from the same drive shaft 40 such as the liquid coolant pump, a fluid compressor, or a hydraulic pump.

As explained above, the generator 14 can be oil cooled. The cooling system 80 using oil can also provide for lubrication of the generator 14. In the illustrated aspects, the generator 14 can be a liquid cooled, cooling system 80 including at least the cooling fluid inlet port 82 and the cooling fluid outlet port 84 for controlling the supply of the cooling fluid to the cooling system 80. The cooling system 80 can further include, for example, a cooling fluid reservoir 86 and various cooling passages within the generator 14. The drive shaft 40 can provide one or more channels or paths for coolant or fluid coolant flow 85 (shown schematically as arrows) for the main machine rotor 52, exciter rotor 62, and PMG rotor 72, as well as a rotor shaft cooling fluid outlet 88, such as the second coolant outlet port 91, wherein residual, unused, or unspent oil can be discharged from the drive shaft 40.

In non-limiting examples of the generator 14, the fluid coolant flow 85 can further be directed, exposed, sprayed, or otherwise deposited onto the set of stator windings 90, the set of end turns 92, or onto alternative or additional components. In this example, the fluid coolant flow 85 can flow from the drive shaft 40 radially outward toward the set of stator windings 90 or the set of stator winding end turns 92. In this sense, the coolant can cool the respective set of stator windings 90 or set of stator winding end turns 92 via the set of fluid passages coupled to the cooling fluid reservoir defined as the coolant source 81.

During power-generating operations, the rotation of the drive shaft 40 relative to the stationary generator 14 components ultimately induces or generates current in the main machine stator windings 90, which is further provided to a generator power output (not shown). The generator power outlet can further supply the generated current to power or energize a set of electrical loads. Specifically, the rotation of a set of permanent magnets affixed to the PMG rotor 72 relative to the PMG stator 74 generates current in the PMG stator that is provided to the exciter stator 64. In turn, the rotation of the exciter rotor 62 relative to the energized exciter stator 64 generates current in the exciter rotor 62 that is further provided to the main machine rotor 52. The rotation of the energized main machine rotor 52 relative to the main machine stator 54 or set of stator windings 90 generates power output current provided to the generator power output, and to a set of electrical loads or an electrical bus.

Figure 4:
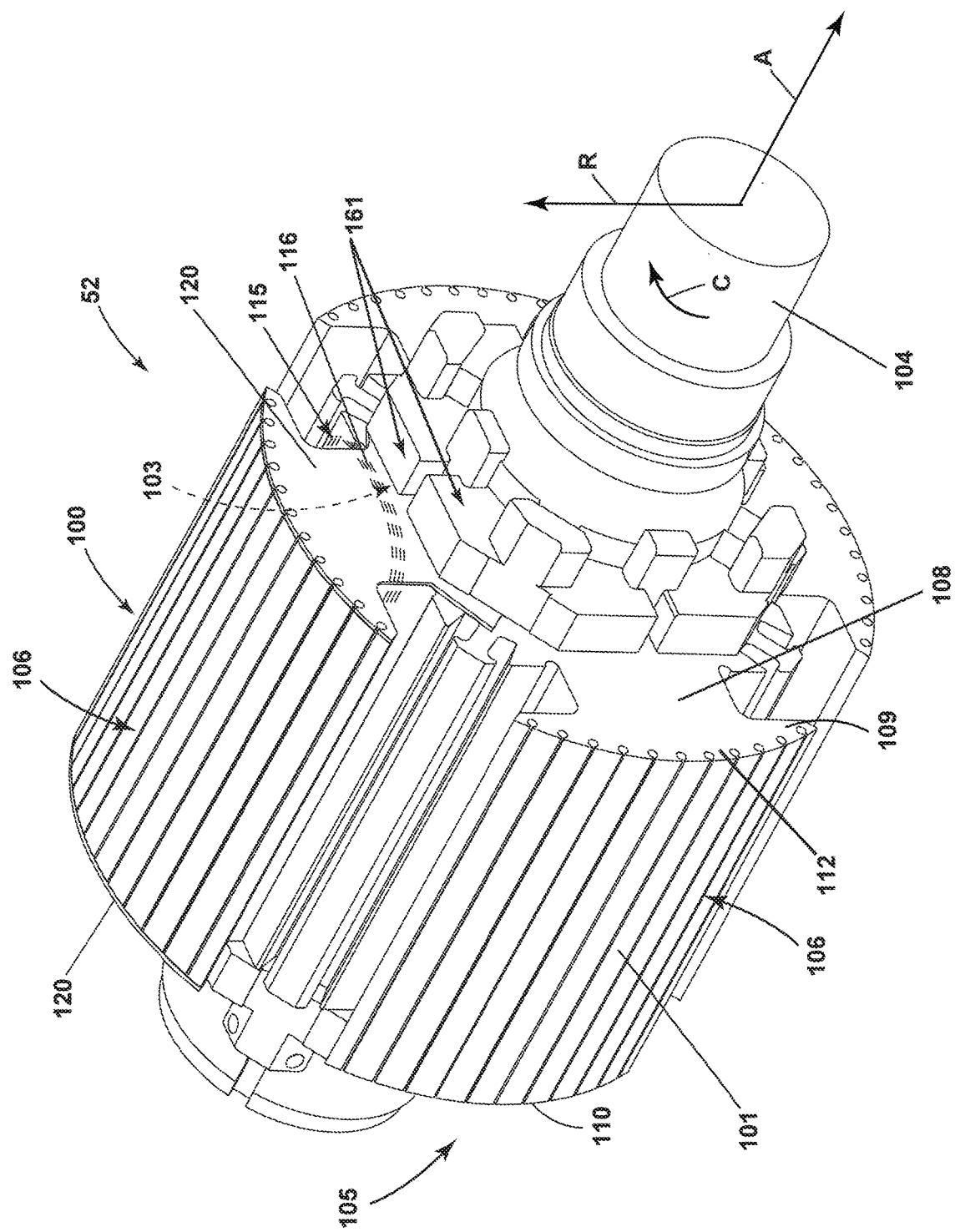
FIG. 4 is a perspective view of a rotor body in the generator of FIG. 1 in accordance with various aspects described herein.

Turning to FIG. 4, the main machine rotor 52 is illustrated in further detail. For reference, an axial direction A, radial direction R, and circumferential direction C are indicated.

The main machine rotor 52 comprises a rotor body 100 with an outer surface 101, a central shaft 104 extending axially, and a set 105 of radially-extending rotor poles 106. Each rotor pole 106 in the set of rotor poles 105 can include a radially-extending post 108 having a first axial end 109 and a second axial end 110 spaced from the first axial end 109, with the post 108 terminating radially at the outer surface 101 in a radial cap 112.

The post 108 can be configured to receive a set of electrically-conductive windings 115 about the post 108 (illustrated in dashed line, and exaggerated for clarity) to define the rotor pole 106. The set of windings 115 can define winding end turns 116 extending axially beyond the post 108. While the set of windings 115 or the winding end turns 116 can refer to multiple windings or end turns, an end turn can also include only one of the set of rotor windings 115, or only one portion of the set of windings 115 extending axially beyond the post 108.

At least one winding end turn support 161 can be provided in the rotor body 100. In the example shown, multiple first winding end turn supports 161 are shown projecting radially from the rotor body 100 proximate the first axial end 109 of the post 108 and contiguous with the rotor body 100. The first winding end turn supports 161 can be such that at least a portion of the end turns 116 of the set of windings 115 contact, or are in a thermally conductive relationship, with at least one surface of the first winding end turn support 161. In one non-limiting example, the contact or thermally conductive relationship between the end turns 116 of the set of windings 115 can be a radially outward surface of the first winding end turn support 161 that radially underlies the end turns 116 of the set of windings 115.

Similar to the winding end turn support 161, at least one second winding end turn support 162 (shown in FIGS. 5 and 6) can be included in the rotor body 100 and located near the second end 110 of the post 108. The second winding end turn support 162 can be configured substantially similar to the first winding end turn support 161 to contact or provide thermal connection between the end turns of the set of windings 115.

In addition, a recess 103 can be included at the rotor body 100 adjacent the winding end turn support 161. The recess 103 can be at least partially defined by the axial spacing between the first winding end turn support 161 and the post 108 (shown in further detail in FIG. 7).

An axial end cap or "end cap" 120 can be located adjacent at least one of the first axial end 109 or the second axial end 110 of the post 108. In the example shown, end caps 120 are located at both the first axial end 109 and second axial end 110 of the post 108. The end cap 120 can be in the form of a generally flat layer having an axially-facing geometric profile matching that of the post 108, including the radial cap 112. The end cap 120 can be formed of the same material as the post 108; alternately, different materials can be utilized for the post 108 or end cap 120. In one non-limiting example, the post 108 can include iron and the end cap 120 can include copper. The end cap 120 can, for example, function or operate to balance rotation of the main machine rotor 52 during operation, or to aid in cooling the set of windings 115 or post 108, such as by conductive heat transfer. It will be understood that any number of end caps 120 can be utilized, including at either or both of the first axial end 109 or the second axial end 110 of any post 108 in the main machine rotor 52.

Figure 5:
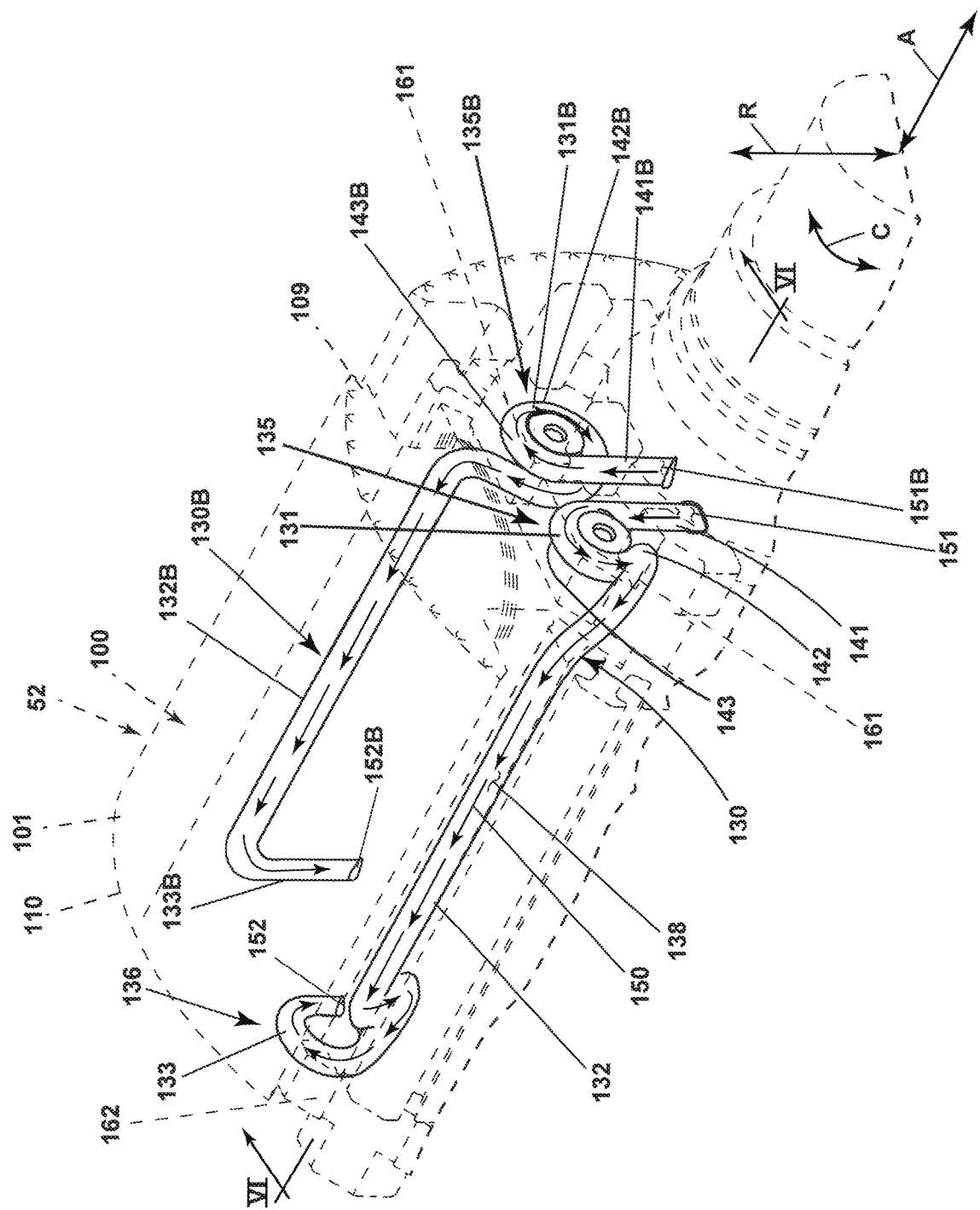
FIG. 5 is a perspective view of a portion of the rotor body of FIG. 4 illustrating a set of conduits in accordance with various aspects described herein.

Referring now to FIG. 5, a portion of the rotor body 100 is illustrated with the outer surface 101 shown in phantom. At least one hollow conduit 130 can be located within the rotor body 100. The conduit 130 can include a first portion 131 extending radially through the rotor body 100, as well as a second portion 132 extending axially through the rotor body 100. More specifically, the first portion 131 can include at least a first U-shaped bend 135 located within the first winding end turn support 161. The first U-shaped bend 135 can include a first leg 141 extending radially outward from a hollow shaft center, a second leg 142 extending radially inward, and a curved third leg 143 connecting or fluidly coupling the first leg 141 with the second leg 142. The third leg 143 can extend circumferentially and also radially underlie the end cap 120 (FIG. 4). A second U-shaped bend 136 is illustrated in a third portion 133 of the conduit 130 proximate the second end 110 of the post 108, though this need not be the case. The second U-shaped bend 136 can be substantially similar to the first U-shaped bend 135, and is not described, for brevity.

It is further contemplated that both the first portion 131 and the second portion 132 of the conduit 130 can radially underlie an axial portion of the post 108 or rotor body 100 (or a surface thereof), thereby radially underlying the axial length of the set of windings 115 wrapping the post 108.

Still further, while two conduits 130 are illustrated within the rotor body 100 proximate the post 108, any number of conduits 130 can be utilized. In one non-limiting example, the structure of the conduits 130 can be present at each rotor pole 106, each post 108, or a subset of the rotor poles 106 or posts 108.

The conduit 130 can define a fluid passage 138 that is fluidly coupled to the coolant source 81 of the cooling system 80 (FIG. 3), such that cooling fluid can be provided to the post 108 for cooling of the set of windings 115 (FIG. 4). Arrows 150 indicate a direction fluid flow through the fluid passage 138. In one non-limiting example, at least a portion of the first leg 141 can be fluidly connected with a flow of coolant traversing the drive shaft 40 (as explained with reference to FIG. 3). In this sense a first fluid opening 151, proximate the first axial end 109, can fluidly couple the first leg 141 with the coolant flow, and a second fluid opening 152, proximate to the second axial end 110, fluidly coupling the second U-shaped bend 136 with the coolant flow of the drive shaft 40. In the example of FIG. 5, fluid generally flows from the first portion 131, for example, received through the first fluid opening 151, about the first leg 141, through the third leg 143 and second leg 142 of the first U-shaped bend 135 in the conduit 130, and toward the second portion 132 of the conduit 130. The fluid flow can further, optionally, continue through the second U-shaped bend 136, and return through the second fluid opening 152.

A second conduit 130B, similar to the conduit 130, is also illustrated in the example of FIG. 5. The second conduit 130B can include a first portion 131B having a first fluid opening 151B and a first U-shaped bend 135B similar to the first U-shaped bend 135 with a first leg 141B, second leg 142B, and third leg 143 connecting the first and second legs 141B, 142B. The first U-shaped bend 135B can be located within another first winding end turn support 161 as shown. The second conduit 130B can also include a second portion 132B extending axially as well as a third portion 133B extending radially. The third portion 133B can include a second fluid opening 152B. One difference compared to the conduit 130 is that the third portion 133B does not include a U-shaped bend and simply extends in a radial direction toward the second fluid opening 152B as shown. It will be understood that the rotor body 100 can include any number of internal conduits defining fluid passages, including conduits having bends or other geometric features, proximate either or both the first end 109 or second end 110. In addition, the U-shaped bend 135B can be located within another winding end turn support 161B circumferentially spaced from the first winding end turn support 161. Additionally or alternatively, the winding end turn support 161 can be in the form of a radially-projecting support that is continuous in a circumferential direction about the rotor body 100, such that multiple U-shaped bends of corresponding multiple conduits can be contained within a single winding end turn support.

Figure 6:
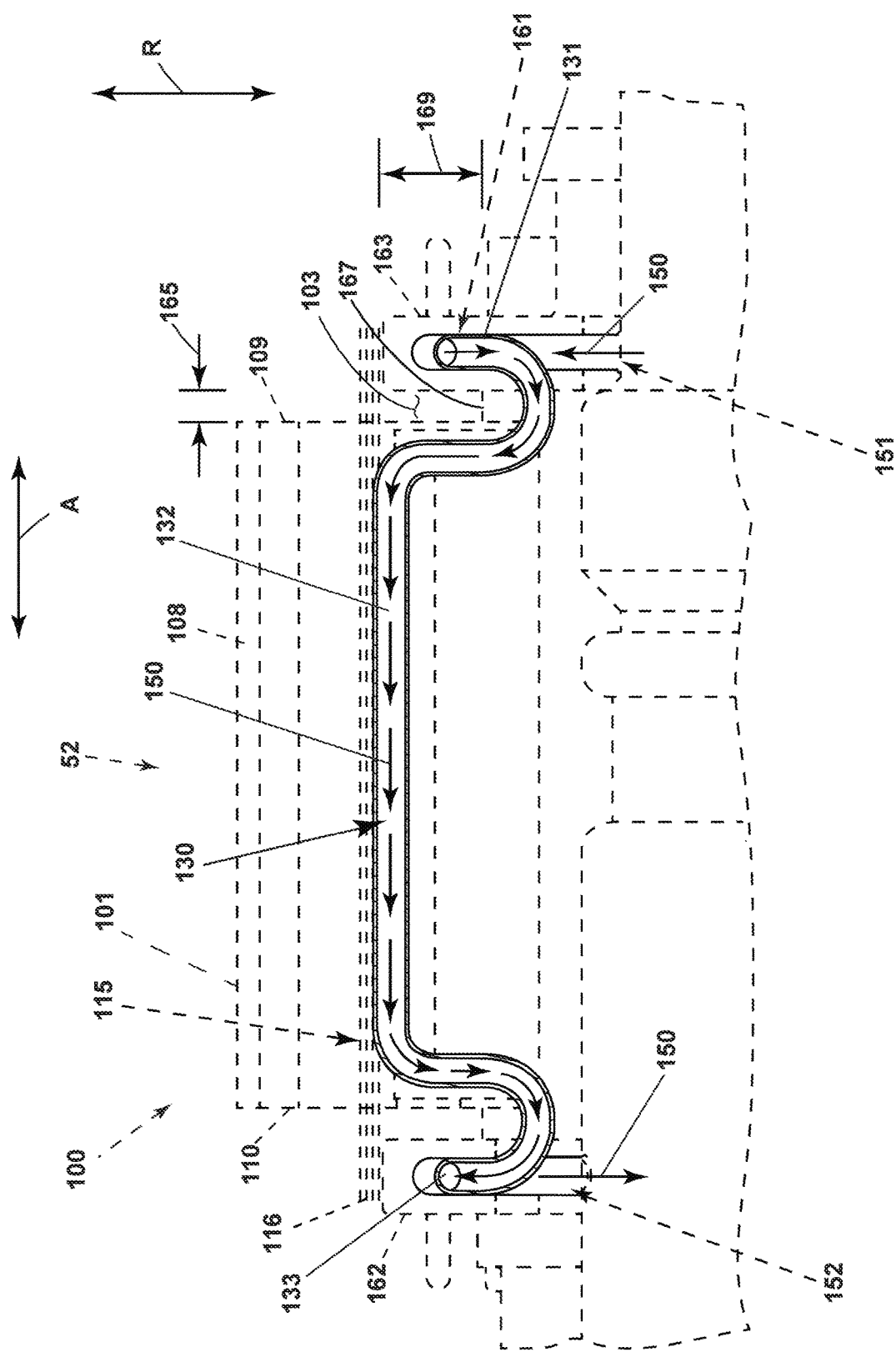
FIG. 6 is a sectional view along line VI-VI of FIG. 5 illustrating the set of conduits of FIG. 5 with a bend, as well as a recess in the rotor body, in accordance with various aspects described herein.

Turning to FIG. 6, a cross-sectional view of a portion of the main machine rotor 52 is illustrated with the outer surface 101 of the rotor body 100 shown in phantom. The first U-shaped bend 135 is located within the first winding end turn support 161, and the second U-shaped bend 136 is located within the second winding end turn support 162. More specifically, the first winding end turn support 161 can include a radial segment 163 that is not contiguous with the rotor body 100, being spaced from the post 108 by the recess 103. The first U-shaped bend 135 can be located within the radial segment 163 as shown. Each U-shaped bend 135, 136 can be located within a radial segment 163 of a respective winding end turn support 1651, 162.

Cooling fluid is illustrated flowing through the first fluid opening 151, into the U-shaped bend 135 in the first portion 131, through the second portion 132, through the second U-shaped bend 136 in the third portion 133, and through the second fluid opening 152. In this manner, cooling fluid such as oil can be circulated or otherwise utilized to cool portions of the main machine rotor 52, including the rotor body 100, the set of windings 115, or a combination thereof.

As described above, the rotor body 100 can include the recess 103 adjacent the winding end turn support 161 and extending radially into the rotor body 100. A width 165 of the recess 103 is illustrated between the first winding end turn support 161 and the post 108. The width 165 can be, in non-limiting examples, between 1 mm and 10 mm, including between 3 mm and 4 mm. In this manner, the first winding end turn support 161 can at least partially surround the U-shaped bend 135 of the conduit 130 and at least partially define the recess 103. In addition, the recess 103 can also have an inner surface 167 defining a depth 169 relative to a radially outermost surface of the first winding end turn support 161 as shown. In one non-limiting example, the radial segment 163 of the winding end turn support 161 can be at least partially radially defined by the depth 169, as shown. The inner surface 167 can be located radially outward of at least a portion of the conduit 130 as shown.

Referring now to FIG. 7, a portion of the rotor body 100 is shown. Any suitable manufacturing method or process can be utilized to form the rotor body 100, including casting or additive manufacturing. As used herein, the term "additive manufacturing" or "AM" generally refers to manufacturing processes wherein successive layers of material(s) are provided on each other to "build-up," layer-by-layer, a three-dimensional component. The successive layers generally fuse together to form a monolithic unitary component, which can have a variety of integral sub-components. "Monolithic," as used herein, refers to a unitary structure lacking interfaces or joints by virtue of the materials of each layer fusing to or melting with the materials of adjacent layers such that the individual layers lose their identity in the final unitary structure. AM is an appropriate name to describe the technologies that build 3D objects by adding layer upon layer of material, whether the material is plastic, metal, a composite, or the like. AM technologies can utilize a computer, 3D modeling software (Computer Aided Design or CAD), machine equipment, and layering material. Once a CAD sketch is produced, the AM equipment can read in data from the CAD file and lay down or add successive layers of liquid, powder, sheet material or other material, in a layer-upon-layer fashion to fabricate a 3D object. It should be understood that the term "additive manufacturing" encompasses many technologies including subsets like 3D Printing, Rapid Prototyping (RP), Direct Digital Manufacturing (DDM), layered manufacturing, and additive fabrication. Non-limiting examples of additive manufacturing that can be utilized to form an additively-manufactured component include powder bed fusion, vat photopolymerization, binder jetting, material extrusion, directed energy deposition, material jetting, or sheet lamination.

In addition, a bolster 125 is illustrated over portions of the rotor body 100. Additively-manufactured components are often built along a preselected build direction which is chosen to minimize stresses within the component during the build process. Components having laterally-protruding features with respect to the build direction can experience internal stresses during manufacture, which can cause undesirable warping of the component. The bolster 125 can be utilized to mitigate such stresses on portions of the rotor body 100 during the build procedure.

In addition, the bolster 125 is schematically illustrated as a generally cylindrical body overlying portions of the rotor body 100. It will be understood that any suitable geometric profile can be utilized for the bolster 125. In one non-limiting example, the bolster 125 can have a geometric profile that matches that of the post 108. It is further contemplated that portions of the bolster 125 can fill the space within the recess 103 (FIG. 6) during forming of the rotor body 100.

An exemplary build direction 170 is shown in a direction parallel to the axial direction A. The rotor body 100 can be formed by serially forming layers of material along the build direction 170. An exemplary first layer 171, second layer 172, third layer 173, and fourth layer 174 schematically illustrate that the rotor body 100 can be built up with serially-added layers of material to form the bolster 125, conduit 130, post 108, and the like. For clarity, the layers 171, 172, 173, 174 are shown with exaggerated thicknesses and spacing. It should be understood that the layers 171, 172, 173, 174 can have any suitable thickness, and are provided as examples, for understanding. For example, the second layer 172 can be formed directly onto the first layer 171, and the fourth layer 174 can be formed directly onto the third layer 173.

Any suitable material can be utilized for the layers 171, 172, 173, 174, including the same or differing materials. In one non-limiting example, the same material can be utilized for each of the layers 171, 172, 173, 174. In another non-limiting example, a single layer e.g. the fourth layer 174 can include multiple materials in different portions of the layer, such as iron and aluminum. In still another non-limiting example, the first layer 171 can include iron and the second layer 172 can include aluminum alloy.

In this manner, the rotor body 100 can be built up by serially adding layers of material along the build direction 170 to form the bolster 125, post 108, first and second winding end turn supports 161, and conduit 130 having at least one U-shaped bend. The bolster 125 can provide support for the post 108 that protrudes radially during the build process. The bolster 125 can provide for relief of any material stresses that may be present within the post 108 during the formation of the rotor body 100.

Turning to FIG. 8, the rotor body 100 is shown after removal of the bolster 125. In the example shown, the post 108 has an exposed surface 180 configured to receive the end cap 120 and set of windings 115 (FIG. 4) after removal of the bolster 125.

Figure 9:
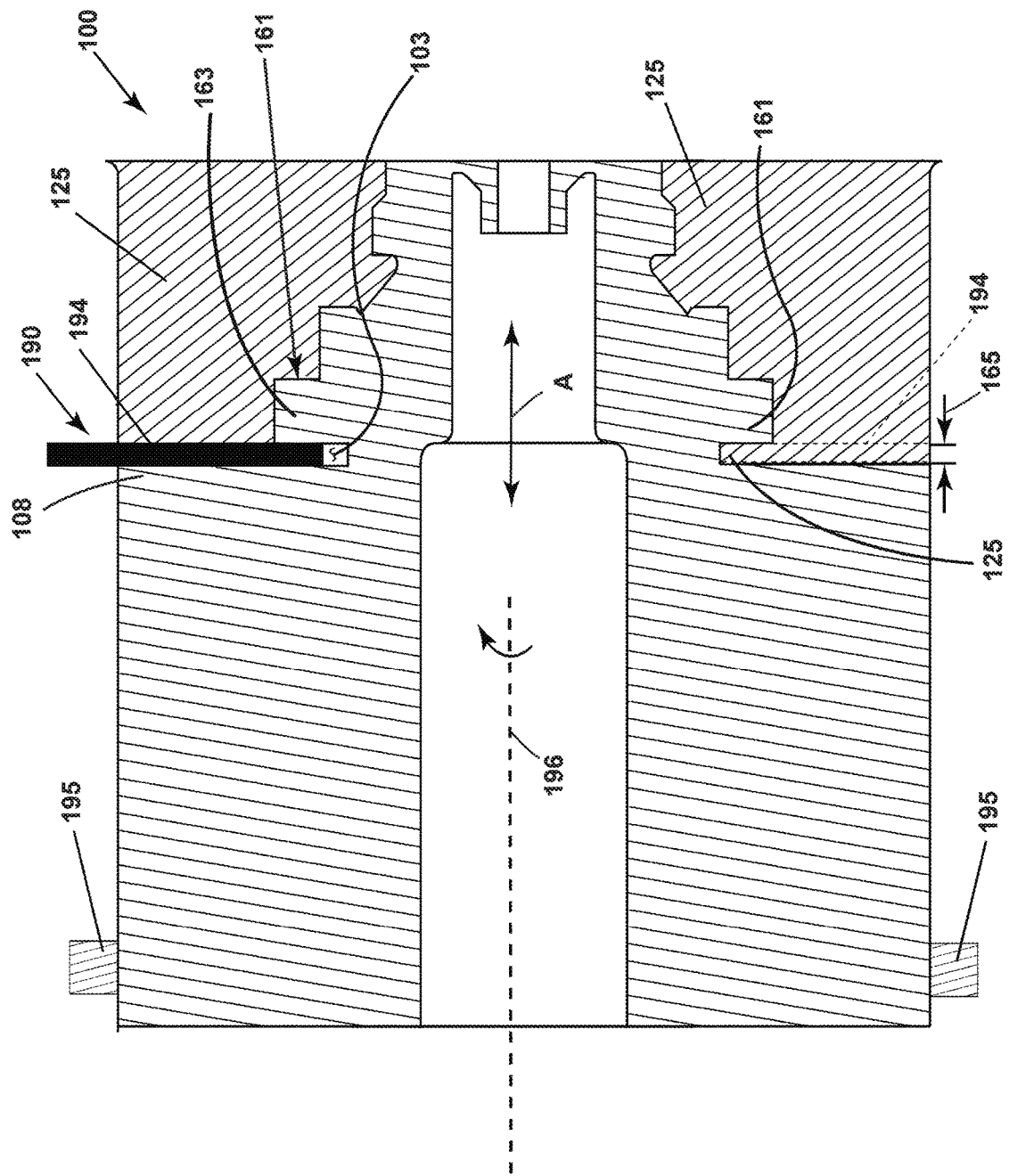
FIG. 9 is a schematic view of the rotor body of FIG. 4 with a removal tool in accordance with various aspects described herein.

FIG. 9 schematically illustrates a sectional view of the rotor body 100 along with a removal tool 190 that can be utilized to remove material from the rotor body 100. In the example shown, the bolster 125 is illustrated with a different cross-hatching compared to the post 108 and first winding end turn support 161. Such illustration is for visual clarity, and it is contemplated that the bolster 125 can include the same material, or a different material, compared to the post 108, first winding end turn support 161, or other portions of the rotor body 100.

In the example shown, the removal tool 190 can include a computer numerical control (CNC) lathe having a carbide tool 194. The rotor body 100 can be secured by a suitable attachment, such as a clamping member 195, and rotated about a central, axially-extending axis 196. The carbide tool 194 can be inserted or driven into the rotor body 100 and remove material from the rotor body 100, thereby forming the exposed surface 180 of the post 108.

Furthermore, in the example shown, the rotor body 100 has been formed with the first winding end turn support 161 spaced axially from the post 108 to define the recess 103, with the bolster 125 filling the recess 103. As the rotor body 100 is rotated, the carbide tool 194 can remove material from the body 100, i.e. remove the bolster 125 from the recess 103, to "hollow out" the volume bound within the recess 103. In this sense, the removal of material can form, define, or otherwise at least partially create the recess 103. In an alternate example, the first winding end turn support 161 and the post 108 can be formed directly adjacent one another (e.g. without the bolster 125 axially spacing the respective post 108 and first winding end turn support 161), or with the bolster 125 radially overlying the first winding end turn support 161. In such a case, the carbide tool 194 can remove portions of both the bolster 125 and the first winding end turn support 161 to form the recess 103. Additionally, or alternatively, the removal tool 190 itself can rotate relative to the rotor body 100 to remove material from the rotor body 100.

In one non-limiting example, the entire bolster 125 can fall away, or otherwise be removable from the rotor body 100 upon formation of the exposed surface 180 via the carbide tool 194. Put another way, the bolster 125 can be formed with the post 108 such that removal of material from the bolster 125 can cause separation of the entire bolster 125 from the remainder of the rotor body 100. In this manner, at least a portion of the bolster 125 can be removed from the rotor body 100 by relative rotation of one of the rotor body 100 or the removal tool 190 to the other of the rotor body 100 or the removal tool 190.

In addition, the removal tool 190 can be utilized to smooth or polish the exposed surface 180 (FIG. 7) of the post 108 during the removal operation. In one example, the exposed surface 180 can be smoothed or polished by the removal tool 190 to have a "machined finish," including having a surface roughness average between 0.4 and 3.0 micrometers. After removal of the bolster 125 and smoothing of the exposed surface 180, the end cap 120 (FIG. 4) can be secured to the exposed surface 180 of the post 108.

Figure 10:
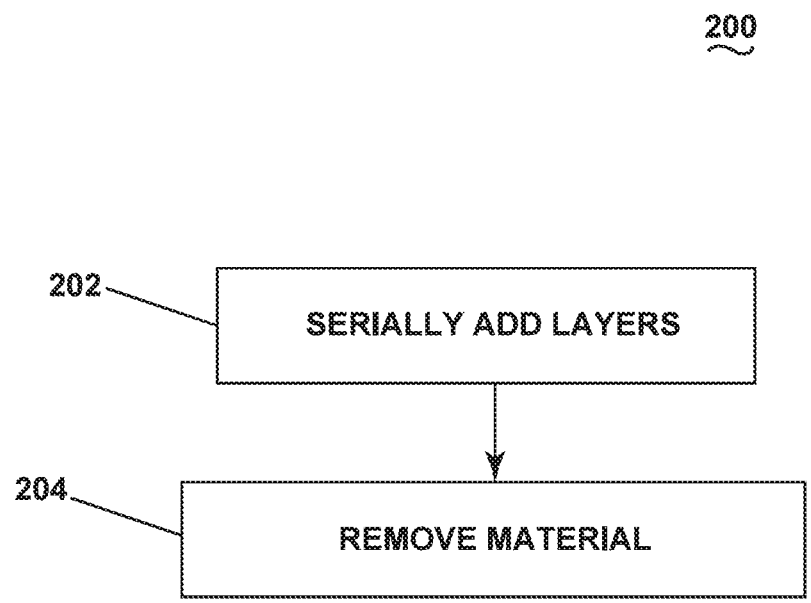
FIG. 10 is a flowchart illustrating a method of forming the rotor body of FIG. 4 in accordance with various aspects described herein.

Turning to FIG. 10, a method 200 of forming the rotor body 100 is illustrated. At 202, the method 200 includes serially adding layers of material, such as the layers 171, 172, 173, 174, along the build direction 170 to form the rotor body 100 having the radially-extending post 108 configured to receive the set of electrically-conductive windings 115, and also having the radially-extending winding end turn support 161, 162 formed contiguously from the rotor body 100. The rotor body 100 at 202 can be formed with the central shaft 104 as well as the recess 103. For example, at 202, serially adding layers can include serially adding layers of material along the build direction 170 to form the recess 103 in the rotor body 100 between the radial segment 163 of the winding end turn support 161 and the post 108. In addition, the method 200 can include serially adding layers of material to form the bolster 125, including forming multiple bolsters 125 for corresponding multiple posts 108, or forming a single bolster 125 supporting multiple posts 108, in non-limiting examples. In this manner, the rotor body 100 can be formed with the recess, central shaft, conduit, and bolster all formed in situ during the build process.

At 204, the method 200 includes removing at least a portion of the rotor body 100 by relative rotation of one of the rotor body 100 or the removal tool 190, such as the carbide tool 194, to the other of the rotor body 100 or the removal tool 190, such that the radial segment 163 of the winding end turn support 161 is not axially contiguous with the rotor body 100. For example, the method 200 at 204 can include removing material from the bolster 125, winding end turn support 161, or other portions of the rotor body 100, to form the recess 103. Optionally, the method 200 can include removing portions of corresponding multiple bolsters simultaneously via the removal tool 190, in an example where the rotor body 100 is formed with multiple bolsters 125. The method 200 can also include forming, via the removal tool 190, the exposed surface 180 of the post 108 by removing material from the rotor body 100. Optionally, the method 200 can include securing the end cap 120 to the exposed surface 180 of the post 108.

Figure 11:
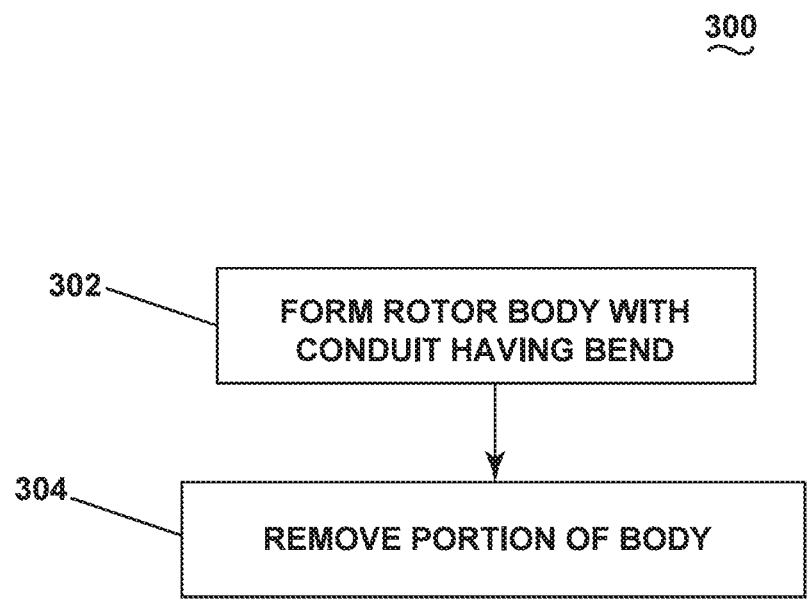
FIG. 11 is a flowchart illustrating another method of forming the rotor body of FIG. 4 in accordance with various aspects described herein.

FIG. 11 illustrates another method 300 of forming the rotor body 100. At 302, the method 300 includes forming the monolithic rotor body 100 having the central shaft 104 defining the axial direction A, the hollow conduit 130 defining the fluid passage 138 with the first portion 131 having the U-shaped bend 135 and the second portion 132 extending axially, the radially-extending post 108 configured to receive the set of windings 115, and the winding end turn support 161, 162 axially spaced from the post 108. Optionally, the method 300 can include forming the rotor body 100 with the bolster 125 adjacent the post 108.

At 304, the method 300 includes removing a portion of the rotor body 100 by relative rotation of one of the rotor body 100 or the removal tool 190 to the other of the rotor body 100 or the removal tool 190. Optionally, the method 300 can include securing the end cap 120 to the exposed surface 180 of the post 108. Optionally, the method 300 can include forming the monolithic rotor body 100 with the conduit 130 having the U-shaped bend 135, 136 within the winding end turn support 161, 162.

Aspects disclosed herein provide for a method of forming an electric machine with improved finishing, simplified design, and improved process efficiencies. Formation of the rotor as a monolithic or unitary body having the post, recess, and conduits as described herein provides for a simplified construction or assembly process for the generator. The use of a CNC turning lathe can simplify the process of removing removable structures utilized during the build process while also providing an improved surface finish, or "machined finish," at the core end faces, which also improves the assembly between the iron core and copper end plates in the assembled electric machine or generator. Such a machined finish further provides for improved operation of the assembled electric machine or generator, such as prevention of charge buildup on uneven surface portions. Aspects provide for a low cost, simplified manufacturing solution for removing bulk portions of supports utilized during an additive manufacturing process for the electric machine.

To the extent not already described, the different features and structures of the various aspects can be used in combination with each other as desired. That one feature cannot be illustrated in all of the aspects is not meant to be construed that it cannot be, but is done for brevity of description. Thus, the various features of the different aspects can be mixed and matched as desired to form new aspects, whether or not the new aspects are expressly described. Combinations or permutations of features described herein are covered by this disclosure.

This written description uses examples to disclose aspects of the disclosure, including the best mode, and also to enable any person skilled in the art to practice aspects of the disclosure, including making and using any devices or systems and performing any incorporated methods. The patentable scope of the disclosure is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims.

A method of forming a rotor for an electric machine, the method comprising serially adding layers of material along a build direction to form a rotor body having a radially-extending post configured to receive a set of electrically-conductive windings, and also having a radially-extending winding end turn support formed contiguously from the rotor body, and removing material from the rotor body by relative rotation of one of the rotor body or a removal tool to the other of the rotor body or the removal tool such that a radial segment of the winding end turn support is not contiguous with the rotor body.

The method of any preceding clause wherein the serially adding layers further comprises serially adding layers of material along the build direction to form the rotor body with a bolster between the post and the winding end turn support.

The method of any preceding clause wherein the removing further comprises removing material from the bolster.

The method of any preceding clause wherein the serially adding layers further comprises serially adding layers of material along the build direction to define a recess in the rotor body between the radial segment of the winding end turn support and the post.

The method of any preceding clause, further comprising forming an exposed surface of the post via the removal tool.

The method of any preceding clause wherein forming the exposed surface includes polishing the exposed surface to have a surface roughness average between 0.4 and 3.0 micrometers.

The method of any preceding clause wherein the removal tool comprises a computer-numerical-control (CNC) lathe having a carbide tool.

The method of any preceding clause, further comprising forming a conduit within the rotor body defining a fluid passage having at least one U-shaped bend.

The method of any preceding clause wherein forming the conduit comprises forming the U-shaped bend with a first leg extending radially, a second leg extending radially, and a third leg extending circumferentially thereby connecting the first leg to the second leg.

The method of any preceding clause wherein forming the conduit comprises forming the U-shaped bend of the conduit within the winding end turn support.

The method of any preceding clause wherein forming the at least one U-shaped bend further comprises forming a first U-shaped bend in a first portion of the conduit, forming a second portion of the conduit extending axially and fluidly coupled to the first portion of the conduit, and forming a second U-shaped bend in a third portion of the conduit fluidly coupled to the second portion of the conduit.

The method of any preceding clause wherein the serially adding layers further comprises serially adding layers of material along the build direction to form the first U-shaped bend within a first winding end turn support and the second U-shaped bend within a second winding end turn support.

The method of any preceding clause, further comprising winding a set of electrically-conductive windings about the post, wherein the winding end turn support radially underlies an end turn portion of the set of electrically-conductive windings.

A method of forming a rotor for an electric machine, the method comprising forming a monolithic rotor body having a central shaft defining an axial direction, a hollow conduit defining a fluid passage with a first portion having a U-shaped bend and a second portion extending axially, a radially-extending post configured to receive a set of windings, and a winding end turn support spaced axially from the post, and removing a portion of the rotor body by relative rotation of one of the rotor body or a removal tool to the other of the rotor body or the removal tool to define a recess between the winding end turn support and the post.

The method of any preceding clause wherein forming the monolithic rotor body comprises forming the U-shaped bend with a radially-extending first leg, a radially-extending second leg, and a third leg connecting the first leg and the second leg.

The method of any preceding clause wherein forming the monolithic rotor body further comprises forming the U-shaped bend within the winding end turn support.

A rotor body, comprising a post extending in a radial direction and configured to receive a set of electrically-conductive windings about the post, a winding end turn support axially spaced from the post by a radially-extending recess, and at least one conduit within the rotor body defining a fluid passage, the at least one conduit having a U-shaped bend located within the winding end turn support and a second portion at least partially radially underlying the recess.

The rotor body of any preceding clause wherein the U-shaped bend further comprises a first leg extending radially, a second leg extending radially, and a third leg connecting the first leg and the second leg.

The rotor body of any preceding clause, further comprising an end cap coupled to an axial end of the post.

The rotor body of any preceding clause wherein the winding end turn support is axially spaced from the end cap.

What is claimed is:

1. A method of forming a rotor for an electric machine, the method comprising:
   serially adding layers of material along a build direction to form a rotor body having a radially-extending post configured to receive a set of electrically-conductive windings, and the rotor body having a radially-extending winding end turn support, and wherein the radially-extending post and the radially-extending winding end turn support are formed contiguous—with the rotor body; and
   removing material from the rotor body by relative rotation of one of the rotor body or a removal tool such that a radial segment of the radially-extending winding end turn support is not contiguous with the rotor body.

2. The method of claim 1 wherein the serially adding layers of material further comprises serially adding layers of material along the build direction to form the rotor body with a bolster between the radially-extending post and the radially-extending winding end turn support.

3. The method of claim 2 wherein the removing further comprises removing material from the bolster.

4. The method of claim 1 wherein the serially adding layers of material further comprises serially adding layers of material along the build direction to define a recess in the rotor body between the radial segment of the radially-extending winding end turn support and the radially-extending post.

5. The method of claim 1, further comprising forming an exposed surface of the radially-extending post via the removal tool.

6. The method of claim 5 wherein forming the exposed surface includes polishing the exposed surface to have a surface roughness average between 0.4 and 3.0 micrometers.

7. The method of claim 1 wherein removing further comprises removing material from the rotor body by relative rotation of one of the rotor body or the removal tool, wherein the removal tool comprises a computer-numerical-control (CNC) lathe having a carbide tool.

8. The method of claim 1, further comprising forming a conduit within the rotor body defining a fluid passage having at least one U-shaped bend.

9. The method of claim 8 wherein forming the conduit comprises forming the at least one U-shaped bend with a first leg extending radially, a second leg extending radially, and a third leg extending circumferentially thereby connecting the first leg to the second leg.

10. The method of claim 9 wherein forming the conduit comprises forming the at least one U-shaped bend of the conduit within the radially-extending winding end turn support.

11. The method of claim 8 wherein forming the at least one U-shaped bend further comprises forming a first U-shaped bend in a first portion of the conduit, forming a second portion of the conduit extending axially and fluidly coupled to the first portion of the conduit, and forming a second U-shaped bend in a third portion of the conduit fluidly coupled to the second portion of the conduit.

12. The method of claim 8 wherein the serially adding layers of material further comprises serially adding layers of material along the build direction to form a first U-shaped bend within a first winding end turn support and a second U-shaped bend within a second winding end turn support.

13. The method of claim 1, further comprising winding a set of electrically-conductive windings about the radially-extending post, wherein the radially-extending winding end turn support radially underlies an end turn portion of the set of electrically-conductive windings.

* * * * *